United States Patent [19]
Morrison

[11] Patent Number: 5,934,709
[45] Date of Patent: Aug. 10, 1999

[54] FLUID COUPLINGS

[75] Inventor: Leigh Wayne Morrison, Footscray, Australia

[73] Assignee: Australasian Steel Products Pty Ltd., Victoria, Australia

[21] Appl. No.: 08/714,066

[22] PCT Filed: Mar. 10, 1995

[86] PCT No.: PCT/AU95/00124

§ 371 Date: Sep. 11, 1996

§ 102(e) Date: Sep. 11, 1996

[87] PCT Pub. No.: WO95/24582

PCT Pub. Date: Sep. 14, 1995

[30] Foreign Application Priority Data

Mar. 11, 1994 [AU] Australia ............................. PM4429

[51] Int. Cl.[6] ............................................... F16L 37/00
[52] U.S. Cl. .......................... 285/39; 285/315; 285/340
[58] Field of Search ........................... 285/39, 314, 315, 285/316, 340

[56] References Cited

U.S. PATENT DOCUMENTS

| | | |
|---|---|---|
| 3,052,261 | 9/1962 | Nyberg . |
| 3,131,905 | 5/1964 | Nyberg . |
| 3,635,501 | 1/1972 | Thorne-Thomsen ................... 285/314 |
| 3,788,598 | 1/1974 | German et al. . |
| 4,696,493 | 9/1987 | Brammer ................................. 285/39 |
| 4,712,810 | 12/1987 | Pozzi ...................................... 285/340 |
| 4,834,423 | 5/1989 | DeLand .................................. 285/39 |
| 5,005,877 | 4/1991 | Hayman ................................. 285/315 |
| 5,378,025 | 1/1995 | Szabo ..................................... 285/39 |
| 5,553,895 | 9/1996 | Karl et al. ............................... 285/39 |
| 5,727,821 | 3/1998 | Miller .................................... 285/318 |

FOREIGN PATENT DOCUMENTS

| | | |
|---|---|---|
| 115529 | 7/1942 | Australia . |
| 227381 | 1/1959 | Australia . |
| 559081 | 12/1983 | Australia . |
| 579370 | 1/1986 | Australia . |
| 646972 | 3/1993 | Australia . |
| 11421 | 1/1977 | Japan ...................................... 285/315 |
| 234686 | 9/1989 | Japan ...................................... 285/340 |
| 593767 | 11/1947 | United Kingdom . |
| 1159155 | 7/1969 | United Kingdom ..................... 285/39 |
| 1533785 | 11/1978 | United Kingdom ..................... 285/39 |

Primary Examiner—Eric K. Nicholson
Attorney, Agent, or Firm—Hovey, Williams, Timmons & Collins

[57] ABSTRACT

A fluid coupling comprising releasably interconnectable male and female coupling members for interconnecting fluid flow lines. The male coupling member has an inlet and an outlet connectable to a fluid flow line, whilst the female coupling member has an inlet for receiving the inlet of the male coupling member, and an outlet connectable to another fluid flow line. A locking mechanism exerts a retaining influence on the male coupling member, when received within the female coupling member, to connect the coupling members together. A lock release mechanism is operable to remove the retaining influence of the locking mechanism and release the coupling members. The lock release mechanism has a release member manually movable to operate the lock release mechanism. Release member movement includes a preliminary movement to a preparatory position in which the lock release member is then able to operate the lock release mechanism to remove the retaining influence thereof followed by a further movement in at least a non-axial direction which operates the lock release mechanism to remove the retaining influence. Biasing means acts on the release member to bias the release member away from the preparatory position.

37 Claims, 2 Drawing Sheets

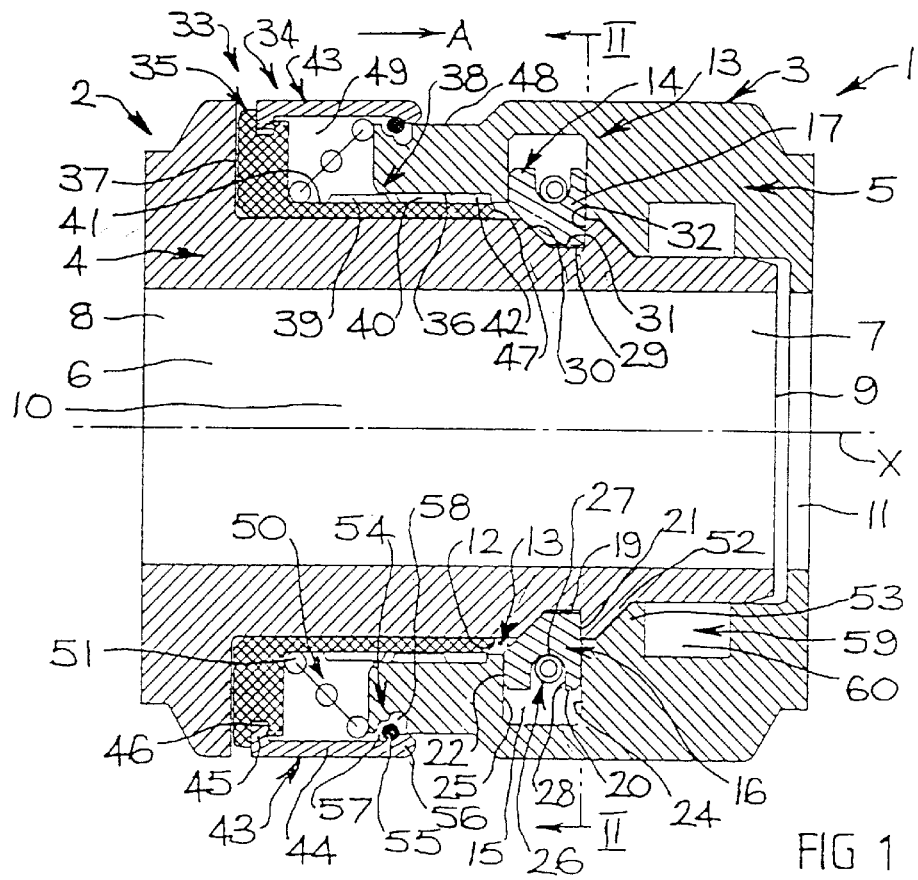
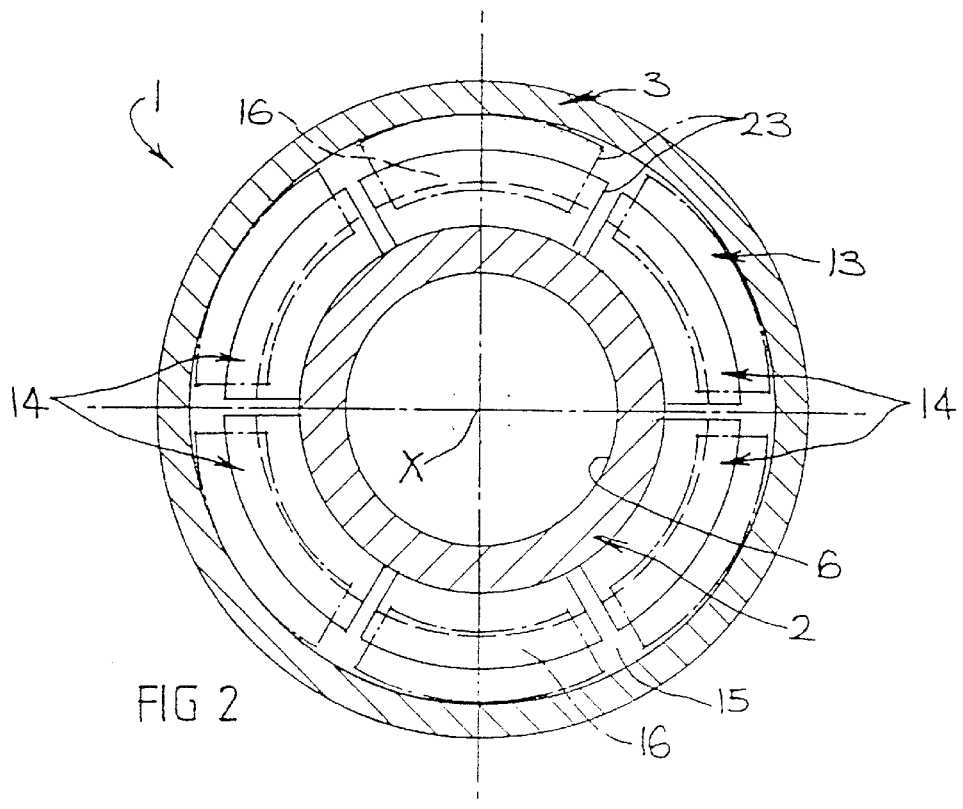

FLUID COUPLINGS

This invention relates generally to fluid couplings and in particular to couplings which incorporate quick connection and release mechanisms between male and female coupling members interconnecting fluid flow lines.

A number of fluid couplings of the above type have been developed. Applicant's Australian Patent No. 646972 describes several prior art fluid couplings and an improvement over these. That disclosure particularly relates to quick connection and release fluid couplings and an improvement over these. That disclosure particularly relates to quick connection and release fluid couplings in which a male coupling member is releasably connected to a female coupling member upon insertion of the male member into the female member. A locking mechanism acts to relatively lock the male and female members and generally includes locking elements such as balls suitable to engage in aligned grooves or recesses in the male and female members. Locking release means are also provided to release the locking elements from the respective grooves or recesses and thus allow disconnection of the male member from the female member.

One feature of these previous fluid couplings is that the locking release means are relatively easy and quick to operate and ideally require only a single unassisted movement action to effect disconnection release. While in many domestic and industrial applications, this is particularly desirable, it has been found that these types of fluid couplings may, on occasions, be subject to accidental release by virtue of the release mechanisms employed. While accidental release may occur relatively infrequently and thus be tolerable for the majority of uses, in situations where accidental release cannot be tolerated, ie. in situations where safety may be jeopardized, in high pressure or high flow fluid hoses, or with volatile or expensive fluids, a more reliable release mechanism is preferred, in order that the fluid coupling is deliberately or positively released only when required.

One such pipe coupling is disclosed in Australian Patent No. 579370. In that coupling a cylindrical male member is provided with a groove extending completely about the circumference of its outer surface, and a cylindrical female member is provided with a pair of oppositely located chordal apertures. The apertures and groove are relatively so located so that, when the male and female members are conjoined, a pin driven into each aperture engages tangentially in a portion of the groove in the male member, thus locking the two members together. The pins are of a slightly larger diameter than that of the apertures to ensure an interference fit so that the pins remain fixed in place.

While a fluid coupling conforming to the above parameters serves to ensure that accidental release of the coupling is prevented, the connection arrangement suffers several disadvantages. In particular, the apertures and groove can be difficult to align whilst the pins can be awkward to insert, especially in dirty couplings or blocked apertures. Being separate from the coupling members, the pins can be readily lost or misplaced. Separate tools are required for both the insertion and removal of the pins, and often considerable mechanical force is required to remove the pins and thus effect desired release of the male member from the female member. In addition, unless the pins are fully driven into the apertures they can tend to snag on objects and fixtures in situations where the flow lines and couplings are being dragged or moved about. Thus, such a connection arrangement is at least inconvenient and particularly not suited where release of the coupling may be required on a somewhat regular or frequent basis, or in inconvenient locations.

It is an object of the present invention to overcome or at least alleviate some or all of the disadvantages of the prior art.

Another object of the present invention is the provision of an improved female coupling member for a fluid coupling.

It is a further and particular object of the invention to provide a fluid coupling having interconnectable male and female coupling members, and which generally avoids accidental or unintentional release of the male member relative to the female member.

With these objects in mind, the present invention provides in one aspect a female coupling member, releasably interconnectable with a male coupling member to form a fluid coupling, the female coupling member including:

a tubular coupling body having an inlet end for axially receiving the inlet end of the male coupling member, and an outlet end connectable to a fluid flow line;

a locking mechanism operable to exert a retaining influence on the male coupling member, when received within the female coupling member, to releasably interconnect the male and female coupling members; and, a lock release mechanism selectively operable to remove the retaining influence of the locking mechanism so as to release the male and female coupling members, the lock release mechanism including a release member being manually movable to operate the lock release mechanism, movement of the release member including a preliminary movement to a preparatory position in which the lock release member is then able to operate the lock release mechanism to remove the retaining influence thereof followed by a further movement in at least a non-axial direction which operates the lock release mechanism to remove the retaining influence.

In another aspect, the present invention provides a fluid coupling for interconnecting fluid flow lines, including:

a tubular male coupling member having an inlet end, and an outlet end connectable to a fluid flow line;

a tubular female coupling member having an inlet end for axially receiving the inlet end of the male coupling member, and an outlet end connectable to a fluid flow line;

a locking mechanism operable to exert a retaining influence on the male coupling member, when received within the female coupling member, to releasably interconnect the male and female coupling members; and, a lock release mechanism selectively operable to remove the retaining influence of the locking mechanism so as to release the male and female coupling members, the lock release mechanism including a release member being manually movable at least in a non-axial direction to operate the lock release mechanism, movement of the release member including a preliminary movement to a preparatory position in which the lock release member is then able to operate the lock release mechanism to remove the retaining influence thereof followed by a further movement in at least a non-axial direction which operates the lock release mechanism to remove the retaining influence.

This coupling arrangement differs significantly from prior so-called "quick-release" fluid couplings discussed above, which generally include a sleeve member movable in an axial or longitudinal direction with respect to the axis of he coupling, to a position in which the locking influence of the locking mechanism is removed. The release of such quick-release fluid couplings may, on occasions be accidentally triggered by knocking, jolting, or engaging the sleeve member against another surface, which serves to induce sufficient axial movement for release of the locking mechanism to be effected. That is avoided with the present invention by provision of the lock release mechanism in which a release member is required to undergo non-axial movement.

Preferably, the preliminary movement of the release member is in a direction along a longitudinal axis of the coupling, while the further movement is in a direction about the longitudinal axis. In particular, the release member preferably moves in an axial linear direction during the preliminary movement, and in compound rotational and lineal directions respectively about and along a longitudinal axis of the coupling during the further movement.

In one embodiment, the lock release mechanism is carried on the female coupling member. The mechanism is slidably carried for sliding during the preliminary movement. Moreover, there is at least one screw thread on the female coupling member and at least one co-operable screw thread on the release member. These screw threads progressively interengage upon rotation of the release member to cause the release member to move in the compound rotational and lineal directions during the further movement, in this embodiment. In one embodiment, the female coupling member the female coupling member includes a tubular coupling body defining an axial fluid flow passage and the screw thread of the female coupling member is provided on an inner surface in the flow passage of the coupling body. The release member includes an inner sleeve portion extending into the flow passage and the screw thread of the release member is provided on an outer surface of the inner sleeve portion in this embodiment.

Preferably, the screw threads are disengageable upon reverse direction rotation of the release member. Upon disengagement the screw threads are preferably axially spaced apart, with the release member being axially movable relative to the female coupling member during the preliminary movement in order to bring the screw threads into engagement.

In one embodiment, the lock release mechanism includes a biasing element acting on the release member to bias the release member in an axial direction in which the disengaged screw threads are maintained in spaced apart relation. The release member is then manually movable against the bias to bring the screw threads into engagement. The biasing element is a biasing spring in one embodiment. It is mounted in a circumferential clearance space formed between the release member and the tubular coupling body at the inlet end of the female coupling member, and acts between the release member and tubular coupling body, in this embodiment. Multi-start screw threads are provided on the female coupling member and the release member in one embodiment.

Preferably, the release member includes an outer sleeve portion coaxially surrounding the female coupling member and connected to the inner sleeve portion. That outer sleeve portion is manually grippable for movement to progressively interengage the screw threads. Preferably, the release member also includes a flange portion extending radially from the inner sleeve portion. The outer sleeve portion is connected to the flange portion in order to move the inner sleeve portion for engagement of the screw threads.

In one embodiment, the outer sleeve portion and flange portion are formed integral with one another. In another embodiment, the flange portion has a circumferentially extending and radially outwardly facing groove. Moreover, the outer sleeve portion has a circumferentially extending and inwardly facing flange which engages in the groove to connect the outer sleeve portion to the flange portion.

In one embodiment, the outer sleeve portion overlies and covers the clearance space and biasing spring between the release member and the tubular coupling body.

The locking mechanism preferably includes a plurality of locking elements. Those elements are carried by one of the coupling members and movable between a release position disengaging from the other coupling member, and a locking position in which the locking members extend between the coupling members and engage the other coupling member to releasably interconnect the coupling members together. The release member, upon movement to operate the lock release mechanism, preferably engages the locking elements and moves them to their release position to disengage the coupling members.

Preferably, the locking mechanism includes a circumferential retaining recess provided in the female coupling member. The locking elements preferably include arcuate locking segments positioned in side-by-side relation along the recess for inward movement from the release position to the locking position. Preferably, the locking elements are generally radially movable between the release and locking positions. The locking mechanism preferably includes biasing means engaging and biasing the locking elements into the locking position, and the release member engages the locking elements upon movement thereof to radially drive the locking elements against the bias into the release position.

Preferably, the release member includes a release sleeve. In one embodiment, the sleeve includes the inner sleeve portion extending coaxially between the interconnected coupling members and having an abutment rim provided by the end region of the inner sleeve portion facing toward the locking elements. Movement of the release member to operate the lock release mechanism causes the release sleeve to move in an axial direction toward the locking elements, and engagement with the abutment rim drives the locking elements into the release position, in this embodiment.

The following description refers to preferred embodiments of the coupling of the present invention. To facilitate an understanding of the invention, reference is made in the description to the accompanying drawings where the coupling is illustrated in those preferred embodiments. It is to be understood that the coupling is not limited to the preferred embodiments as hereinafter described and as illustrated in the drawings.

In the drawings, where like reference numerals identify the same or like components:

FIG. 1 is a longitudinal cross-sectional view of a fluid coupling, according to one preferred embodiment of the present invention, and showing the male and female coupling members assembled and interconnected together;

FIG. 2 is a cross-sectional view of the coupling of FIG. 1, taken through Section II—II;

Figure 3:
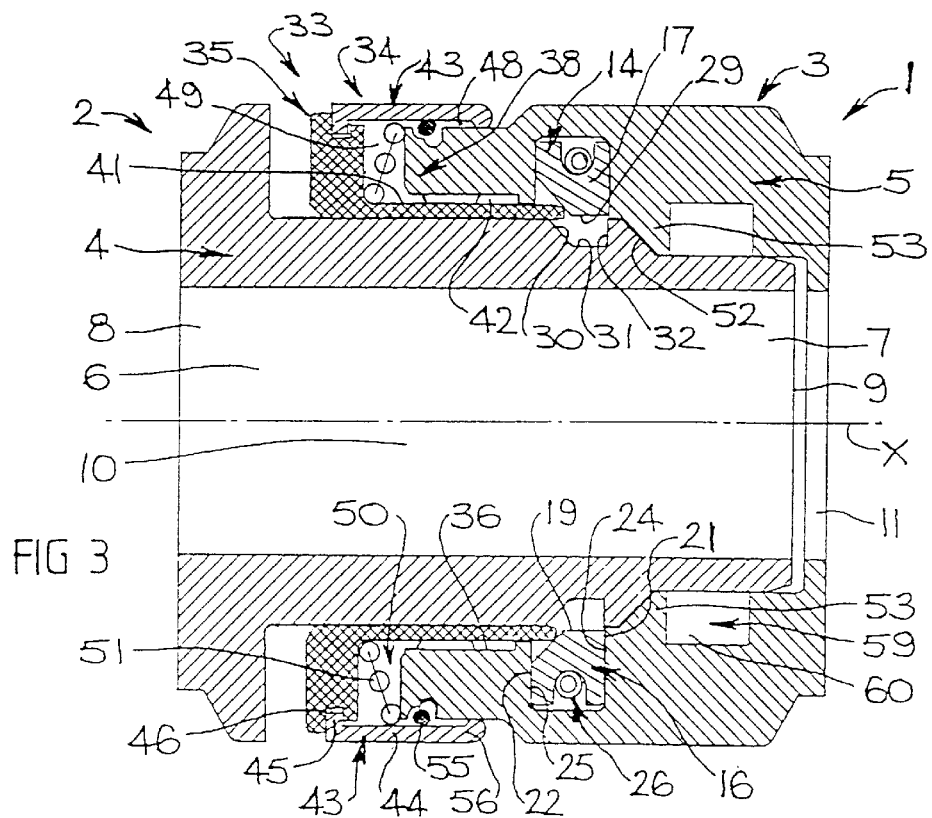
FIG. 3 is a longitudinal cross-sectional view similar to FIG. 1, and showing the coupling members assembled but disconnected ready for separation.

Referring initially to the embodiment of FIGS. 1 to 3, there is generally shown a fluid coupling 1 in an assembled, interconnected and operative condition ready for fluid flow therethrough, although fluid hoses or other lines are not shown connected thereto.

The fluid coupling 1 includes interconnectable male coupling member 2 and female coupling member 3. The male and female coupling members 2,3 each have tubular coupling bodies 4,5 of single piece construction and generally cylindrical in cross-section, although other constructions and cross-sectional shapes may be applicable.

The male coupling body 4 provides an axial fluid flow passage 6 extending therealong and having an inlet end 7 and an outlet end 8 connectable to a fluid flow line. The female coupling body 5 also provides an axial fluid flow passage 9 extending therealong and having an inlet end 10 for receiving the inlet end 7 of the male coupling body 4 and an outlet end 11 connectable to a separate fluid flow line. The outlet ends 8,11 are suitably configured for connection to respective fluid flow lines for fluid flow therebetween. When assembled, the coupling members 2,3 are co-axially aligned on a longitudinal axis X.

The male coupling body 4 further includes an outer circumferential surface 12, generally configured for sliding mating contact within the female coupling member 3, as will be described in more detail hereinafter.

A locking mechanism 13 is provided for selectively, releasably connecting coupling members 2,3 together. The locking mechanism 13 is carried in the female coupling body 5, and includes a plurality of locking elements 14 which are slidably retained within a circumferential retaining recess 15 provided in the female coupling body 5. As shown more clearly in FIG. 2, the retaining recess 15 extends continuously about the internal periphery of the female coupling body 5 and opens radially inwardly into the passage 9.

In this embodiment, the locking elements 14 are in the form of arcuate locking segments 16 spaced apart along the recess 15 so as to extend about and project radially into the passage 9.

The locking segments 16 each include a body 17 having a ramp or inclined surface 18, a front surface 19, an opposite rear surface 20, a retaining surface 21, an opposite side surface 22, and opposite end surfaces 23. In this embodiment the retaining surface 21 and the side surface 22 of each locking segment 16 are adapted for sliding contact with either or both of the side faces 24,25 respectively, of the recess 15. The extent of contact will vary with the operational condition of the fluid coupling, ie. whether the coupling members 2,3 are connected or disconnected, as will become apparent hereinafter.

The locking segments 16 are biased radially out of the recess 15, into the passage 9. In this locking position, as shown in FIG. 1, the locking segments 16 engage with the male coupling member 2 when received in passage 9. That bias is achieved with any suitable biasing means 26. In this embodiment, the biasing means 26 includes a radial biasing spring 27, such as a garter spring, extending about the locking segments 16 and seated within a channel 28, formed in the rear surface 20 of each segment 16. The biasing spring 27 acts to bias the locking segments 16 radially outwardly of the retaining recess 15 into the passage 9. That outward movement of the segments 16 is limited through surface-to-surface abutment of juxtaposed end surfaces 23, of adjacent segments 16, so that the segments 16 are partially retained in the recess 15 at all times.

The male coupling member 2 includes a seating recess 29, extending circumferentially about outer surface 12 of the coupling body 4 and into which the locking segments 16 are received, in their locking position, under action of the biasing spring 27 when the male coupling member 2 is received in the female coupling member 3. The seating recess 29 includes an inclined surface 30, a bottom surface 31 and an abutment surface 32, and is shaped and sized to receive at least a leading portion of the locking segment 16. It is preferred that the inclined surface 30 be a surface-to-surface engaging fit against the ramp surface 18, and that the front surface 19 have a clearance from the bottom surface 31. This ensures a wedge-like transition fit between the locking segments 16 and the seating recess 29 such that once engaged, there is little or no axial movement between the male and female coupling members 2 and 3. The retaining surface 21 and the abutment surface 32 are also preferred to engage by way of a surface-to-surface engaging fit.

The coupling 1 further includes a lock release mechanism 33 operable to selectively release the locking mechanism 13. The lock release mechanism 33 is carried on the female coupling body 5, and includes a lock release member 34.

In this embodiment, the release member 34 includes a lock release sleeve 35 providing an inner sleeve portion 36 and a flange portion 37 extending radially outwardly from one end thereof. The inner sleeve portion 36 is positioned at the inlet end 10 of the female coupling member 3 and extends into the passage 9 of the female coupling body 5. In addition, the inner sleeve portion 36 extends circumferentially about the male coupling body 4 for sliding and rotational movement over the outer surface 12 thereof. Thus, the inner sleeve portion 36 extends co-axially between the interconnected coupling members 2,3.

A screw thread connection 38 is provided between the lock release member 34 and the female coupling member 3. In particular, the screw thread connection 38 includes interengageable screw threads 39,40 provided on an outer surface 41 of the inner sleeve portion 36 of the lock release sleeve 35 and an inner surface 42 in the passage 9 of female coupling body 5, respectively. It is to be noted, that in the assembled operative condition of the fluid coupling 1, as shown in FIG. 1, the lock release member 34 is in a connecting position, with the threads 39,40 out of engagement with one another. In this embodiment, multi-start threads 39,40 are provided. Four start threads may be used in one embodiment.

In this embodiment, the lock release member 34 also includes an actuating sleeve 43 providing an outer sleeve portion 44 co-axially surrounding the female coupling member 3 and connected to the flange portion 37. The actuating sleeve 43 also provides an inwardly directed flange 45 extending from the outer sleeve portion 44 and engaging a radially outwardly facing groove 46 located on the flange portion 37. The actuating sleeve 43 is slidable longitudinally with respect to the longitudinal axis X, sliding movement in the direction of arrow A acting to simultaneously move the lock release sleeve 35 in that direction from the connecting position.

It should be appreciated, that movement of the lock release sleeve 35 can be effected in the absence of the actuating sleeve 43, although that sleeve 43 serves other functions as will become apparent hereinafter.

Preliminary axial sliding movement of the actuating sleeve 43 in the direction A moves the lock release member 34 to a preparatory position where the threads 39,40 start engagement with one another. In this embodiment, that is only a short movement distance and may be of the order of 0.030" to 0.060". In that position, further movement of the lock release sleeve 35 is restricted to compound axial and rotational movement along and about the longitudinal axis X, caused through progressive interengagement of the threads 39,40.

Upon continued movement of the lock release member 34 from the preparatory position to a disconnecting position, an end abutment rim 47 of the inner sleeve portion 36 engages against the exposed ramp surface 18 of the projecting locking segments 16. The abutment rim 47 applies a releasing force to the locking segments 16 tending to radially move them from the seating recess 29, against the bias of the biasing spring 27. That movement moves the locking segments 16 to a release position, thereby removing a retaining influence of the retaining surface 21 on the abutment surface 32. This disconnecting position is shown in FIG. 3, and in this position the coupling 1 is in an assembled, but disconnected and in-operative condition.

Having retracted the locking segments 16 from the seating recess 29, to their release position, the male coupling member 2 is then removable from within the female coupling member 3 so as to separate the coupling members 2,3.

In this embodiment the actuating sleeve 43 is constructed so as to be rotatable about the longitudinal axis X independently of the lock release sleeve 35. In this way, the actuating sleeve 43 can at least substantially isolate the lock release sleeve 35 from accidental rotation leading to engagement of the screw threads 39,40. However, the actuating sleeve 43 and the lock release sleeve 35 may incorporate means (not shown) enabling their driving interconnection for the purpose of deliberately rotating the lock release sleeve 35 upon rotation of the actuating sleeve 43 following screw thread engagement. That means may include drive elements, such as ribbing or teeth, on the flange 45 and in the groove 46 which interengage on gripping the actuating sleeve 43 and moving the lock release sleeve 35 to the preparatory position.

As an alternative, the actuating sleeve 43 may be formed integrally with, or permanently secured to, the lock release sleeve 35 such that it cannot rotate independently.

The actuating sleeve 43 extends between the flange portion 37 of the lock release sleeve 35 and an outer surface 48 of the female coupling body 5 so as to overlie and cover an intervening clearance space 49. The actuating sleeve 43 can slide and rotate over the outer surface 48 taking with it the release sleeve 35.

Movement of the lock release mechanism 33 to force the locking segments 16, from the locking position to the release position, disengaging with the male coupling member 2, enables complete removal of the male coupling member 2 from engagement within the female coupling member 3. Upon that removal, the lock release sleeve 35 and the actuating sleeve 43 can be return moved to the operative condition of the coupling 1 as shown in FIG. 1, ie. the position in which the release member 34 is in the connecting position with the locking segments 16 projecting from the retaining recess 15 into their locking position. That places the locking mechanism 13 in a condition ready to automatically engage the male coupling member 2 at any subsequent time it is inserted within the female coupling member 3, to thus retain it in position.

Alternatively, the release member 34 may be left in the disconnecting position, as shown in FIG. 3, so leaving the locking mechanism 13 in a condition whereby the locking segments 16 remain retracted into the retaining recess 15 in their release position. As a result, the male coupling member 2 may be subsequently freely inserted into the female coupling member 3, without being engaged by the locking mechanism 13. To then effect engagement, the lock release member 34 must be return moved from its disconnecting position of FIG. 3 to its connecting position of FIG. 1 in order that the retaining surface 21 partially or fully engages the abutment surface 32.

In this embodiment, biasing means 50 act to bias the lock release member 34 away from the preparatory position into the connecting position, as shown in FIG. 1. Importantly, that biasing means 50 biases the screw thread 39,40 out of accidental or incidental engagement with one another.

The biasing means 50 includes a biasing element 51, such as a coil spring, acting between the release member 34, preferably at a junction of the sleeve portion 36 and the flange portion 37, and the female coupling body 5, preferably adjacent the actuating sleeve 43. In biasing the release member 34 into the connecting position, the threads 39,40 are maintained out of engagement with one another. In this way accidental or unintentional release of the male coupling member 2 relative to the female coupling member 3, is minimized by resisting axial movement of the release member 34 toward the preparatory position. In this embodiment, the bias of the spring 50 is overcome by manually gripping and forcing the actuating sleeve 43 in the direction of arrow A.

In a disassembled operative position of the coupling 1, ie. where the locking segments 16 are positioned for engagement in the retaining recess 15 of the male coupling body 4, with the coupling members 2,3, separated, the male coupling body 4 can be axially inserted into the passage 9. As insertion proceeds, the locking segments 16 ride over an inclined lead-in region 52 on outer surface 12 the male coupling body 4 before "snapping" into the seating recess 29. In this assembled, operative condition, as shown in FIG. 1, the lead-in region 52 engages an adjacent similarly shaped stop region 53 on the female coupling body 5. The stop region 53 provides an abutment against which the lead-in region 52 may abut during insertion of the male coupling member 2 into the female coupling member 3, such that engagement of these regions 52,53 prevents further movement of the male coupling member 2 in the direction A. This may be useful where the locking segments 16 are retained within the retaining recess 15 by the release member 34 during insertion of the male coupling member 2.

As previously indicated, the actuating sleeve 43 also functions to cover over the clearance space 49 containing the biasing element 51 and into which the flange portion 37 moves during lock release member 34 movement between the connecting and disconnecting positions. As a consequence, the sleeve 43 can prevent dirt, dust and other matter from collecting in the space 49 or fouling the threads 39,40 and the biasing element 51. The incursion of such matter into the clearance space 49 may adversely affect the operation of the fluid coupling 1. In providing that cover, the actuating sleeve 43 remains flush with the female coupling member 3, rather than protruding radially therefrom to cause snagging difficulties in coupling use.

The actuating sleeve 43 also includes movement limiting means 54 to limit its movement in a direction opposite to the direction of arrow A. That limiting means 54 includes a limiting member 55 carried by the female coupling body 5 and which engages against a lip 56, thus preventing movement of the lip 56 over the limiting member 55 and off the female coupling member 3. The female coupling body 5 includes stepped, adjoining recesses 57 and 58 extending about the outer surface 48 of the female coupling body 5 and which are configured to separately receive therein the elongate limiting member 55.

The limiting member 55 is preferably of a resiliently flexible nature such that during initial assembly of the lock release mechanism 34, the limiting member 55 may be compressed into the recess 58 to enable the actuating sleeve 43 to be fitted over it. When the actuating sleeve 43 has been assembled into a position lying over the recess 58, the limiting member 55 is relieved of the compressive force and so loosely located within the recess 57. In this position, the actuating sleeve 43 cannot be removed from the female coupling body 5 unless the limiting member 55 is again compressed into the recess 58.

In this embodiment, the limiting member 55 is in the form of a resilient circlip.

By providing this movement limiting means 54, the male coupling member 2 can be completely removed from the female coupling member 3, without either the actuating sleeve 43 or the release sleeve 35 also being removed or separated from the female coupling member 3. Thus, the release member 34 is retained against loss on the female coupling body 5.

The coupling 1 also includes means 59 to provide a fluid seal between the interconnected male and female coupling members 2,3. In this embodiment, the female coupling body 5 includes a seating recess 60 extending about the internal periphery of the passage 9 in which an appropriate sealing element (not shown) may be sealingly located for sealing engagement with the outer surface 12 of the male coupling body 4. An O-ring or the like sealing element may be provided.

Figure 4:
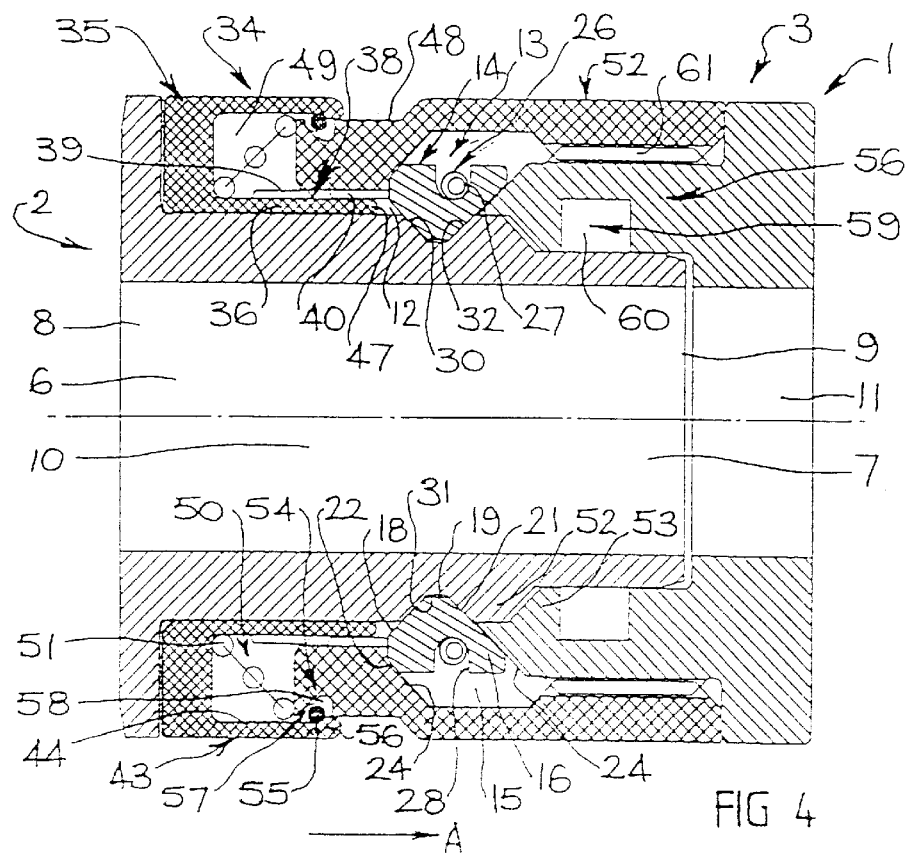
FIG. 4 is a longitudinal cross-sectional view of a fluid coupling, according to another preferred embodiment of the present invention, and showing the male and female coupling members assembled and interconnected together.

A modified embodiment of the coupling 1 is shown in FIG. 4 of the drawings. In that embodiment, where the same reference numerals identify the same or like components as in the previous embodiment, the coupling 1 is generally the same as described above.

However, in this embodiment, the female coupling body 5 is constructed in two sections, comprising an outer section 5a and an inner section 5b. This construction facilitates ease of assembly of the fluid coupling 1, particularly with respect to the insertion of the locking segments 16. In that regard the locking segments 16 can be arranged and assembled adjacent the outer section member 5a, prior to connection of that section 5a with the inner section 5b in any suitable manner. A screw-threaded connection 61 is suitable to interconnect the outer and inner sections 5a,5b.

This modified embodiment also provides inclined retaining and abutment surfaces 21,32 on the locking segments 16 and in the seating recess 29, respectively. In addition, the side faces 24,25 of the recess 15 are similarly inclined, along with opposite side surfaces 22 of the locking segments 16. In this way during release of the locking mechanism 13, the locking segments 16 are displaced at an angle of inclination equal to that of the inclined side faces 24,25. The force needed to displace the locking segments 16 for release may be less in the embodiment of FIG. 3 compared with that of FIG. 1, by virtue of that inclination. However, the retaining effect of the locking segments 16 on the male coupling member 2 is maintained.

Finally, in this embodiment the lock release sleeve 35 and the actuating sleeve 43 of the release member 34 are formed integral with one another.

A fluid coupling according to the present invention requires a disconnection action which cannot be initiated accidentally or unintentionally. The movement is such that at least one and preferably two, separate and distinct movement actions are required for disconnection. As a result ordinary working conditions are unlikely to effect accidental disconnection of the fluid coupling. The fluid coupling thus provides a particularly safe operating environment.

Those skilled in the art will appreciate that there may be many variations and modifications of the coupling described herein which are within the scope of the present invention as defined in the claims appended hereto.

I claim:

1. A female coupling member, releasably interconnectable with a male coupling member to form a fluid coupling, the female coupling member comprising:
   a tubular body having an inlet end for axially receiving the inlet end of the male coupling member, and an outlet end connectable to a fluid flow line;
   a locking mechanism operable to exert a retaining influence on the male coupling member, when received within the female coupling member, to releasably interconnect the male and female coupling members; and,
   a lock release mechanism selectively operable to remove the retaining influence of the locking mechanism so as to release the male and female coupling members, the lock release mechanism including:
      release member being manually movable to operate the lock release mechanism, movement of the release member including a preliminary movement to a preparatory position in which the lock release member is then able to operate the lock release mechanism to remove the retaining influence thereof followed by a further movement in at least a non-axial direction which operates the lock release mechanism to remove the retaining influence; and,
      biasing means acting on the release member to bias the release member away from the preparatory position, the release member being manually moved to the preparatory position against the bias of the biasing means.

2. A female coupling member as claimed in claim 1, wherein the preliminary movement of the release member is in a direction along a longitudinal axis of the coupling, and the further movement of the release member is in a direction about the longitudinal axis of the coupling.

3. A female coupling member as claimed in claim 1, wherein the lock release mechanism is slidably carried on the tubular coupling body, and the release member slidably moves along the tubular coupling body during the preliminary movement.

4. A female coupling member as claimed in claim 1, wherein the release member moves during the further movement in compound rotational and lineal directions respectively about and along a longitudinal axis of the coupling in order to operate the lock release mechanism.

5. A female coupling member as claimed in claim 4, wherein the lock release mechanism is carried on the tubular coupling body, and includes at least one screw thread on the coupling body and at least one co-operable screw thread on the release member, the screw threads progressively interengaging upon rotation of the release member to cause the release member to move in the compound rotational and lineal directions.

6. A female coupling member as claimed in claim 5, wherein the coupling body defines an axial fluid flow passage and the screw thread on the coupling body is provided on an inner surface in the flow passage, and the release member includes an inner sleeve portion extending into the flow passage, the screw thread of the release member being provided on an outer surface of the inner sleeve portion.

7. A female coupling member as claimed in claim 6, wherein the screw threads are disengageable upon reverse direction rotation of the release member, and upon disengagement the screw threads are axially spaced apart, the release member being axially movable relative to the coupling body member during the preliminary movement in order to bring the screw threads into engagement.

8. A female coupling member as claimed in claim 7, wherein the biasing means includes a biasing element acting on the release member to bias the release member in an axial direction in which the disengaged screw threads are maintained in spaced apart relation, the release member being manually movable against the bias to bring the screw threads into engagement.

9. A female coupling member as claimed in claim 8, wherein the biasing element is a biasing spring mounted in a circumferential clearance space formed between the release member and the coupling body at the inlet end thereof, and acts between the release member and coupling body.

10. A female coupling member as claimed in claim 5, wherein multi-start screw threads are provided on the coupling body member and the release member.

11. A female coupling member as claimed in claim 6 wherein the release member includes an outer sleeve portion coaxially surrounding the coupling body and connected to the inner sleeve portion, the outer sleeve portion being manually grippable for movement to progressively interengage the screw threads.

12. A female coupling member as claimed in claim 11, wherein the release member includes a flange portion extending radially from the inner sleeve portion, and the outer sleeve portion is connected to the flange portion in order to move the inner sleeve portion for engagement of the screw threads.

13. A female coupling member as claimed in claim 12, wherein the outer sleeve portion and flange portion are formed integral with one another.

14. A female coupling member as claimed in claim 12, wherein the flange portion has a circumferentially extending and radially outwardly facing groove, and the outer sleeve portion has a circumferentially extending and inwardly facing flange engaging in the groove to connect the outer sleeve portion to the flange portion.

15. A female coupling member as claimed in claim 8, wherein the release member includes an outer sleeve portion co-axially surrounding the coupling body and connected to the inner sleeve portion, the outer sleeve portion overlying and covering the clearance space and biasing spring between the release member and the tubular coupling body, and the outer sleeve portion being manually grippable for movement to progressively interengage the screw threads.

16. A female coupling member as claimed in claim 1, wherein the locking mechanism includes a plurality of locking elements movable between a release position disengaging from the male coupling member and a locking position in which the locking members extend between the coupling members and engage the male coupling member thereby to releasably interconnect the coupling members together, the release member upon movement to operate the lock release mechanism engaging the locking elements and moving them to their release position to disengage the coupling members.

17. A female coupling member as claimed in claim 16, wherein the locking mechanism includes a circumferential retaining recess provided in the coupling body, and the locking elements include arcuate locking segments positioned in side-by-side relation along the recess for inward movement from the release position to the locking position.

18. A female coupling member as claimed in claim 17, wherein the locking elements are generally radially movable between the release and locking positions, the locking mechanism includes biasing means engaging and biasing the locking elements into the locking position, and the release member engages the locking elements upon movement thereof to radially drive the locking elements against the bias into the release position.

19. A female coupling member as claimed in claim 18, wherein the release member includes a release sleeve extending coaxially between the interconnected coupling members and having an abutment rim facing toward the locking elements, whereupon movement of the release member to operate the lock release mechanism causes the release sleeve to move in an axial direction toward the locking elements, engagement with the abutment rim driving the locking elements into the release position.

20. A female coupling member as claimed in claim 19, wherein each of the locking elements has an inclined surface with which the abutment rim engages to radially drive the locking elements.

21. A female coupling member as claimed in claim 19, wherein the release sleeve includes the inner sleeve portion, and the abutment rim is provided by an end region of the inner sleeve portion.

22. A fluid coupling for interconnecting fluid flow lines, including:
a tubular male coupling member having an inlet end, and an outlet end connectable to a fluid flow line;
a tubular female coupling member having an inlet end for axially receiving the inlet end of the male coupling member, and an outlet end connectable to a fluid flow line;
a locking mechanism operable to exert a retaining influence on the male coupling member, when received within the female coupling member, to releasably interconnect the male and female coupling members, and,
a lock release mechanism selectively operable to remove the retaining influence of the locking mechanism so as to release the male and female coupling members, the lock release mechanism including
a release member being manually movable at least in a non-axial direction to operate the lock release mechanism, movement of the release member including a preliminary movement to a preparatory position in which the lock release member is then able to operate the lock release mechanism to remove the retaining influence thereof followed by a further movement in at least a non-axial direction which operates the lock release mechanism to remove the retaining influence; and,
biasing means acting on the release member to bias the release member away from the preparatory position, the release member being manually moved to the preparatory position against the bias of the biasing means.

23. A female coupling member as claimed in claim 22, wherein the preliminary movement of the release member is in a direction along a longitudinal axis of the coupling, and the further movement of the release member is in a direction about the longitudinal axis of the coupling.

24. A female coupling member as claimed in claim 23, wherein the lock release mechanism is slidably carried on the tubular coupling body, and the release member slidably moves along the tubular coupling body during the preliminary movement.

25. A female coupling member as claimed in claim 24, wherein the release member moves during the further movement in compound rotational and lineal directions respectively about and along a longitudinal axis of the coupling in order to operate the lock release mechanism.

26. A fluid coupling as claimed in claim 25, wherein the lock release mechanism is carried on the female coupling member, and includes at least one screw thread on the female coupling member and at least one co-operable screw thread on the release member, the screw threads progressively interengaging upon rotation of the release member to cause the release member to move in the compound rotational and lineal directions.

27. A fluid coupling as claimed in claim 26, wherein the female coupling member includes a tubular coupling body defining an axial fluid flow passage, the screw thread of the female coupling member being provided on an inner surface in the flow passage of the coupling body, and the release member includes an inner sleeve portion extending into the flow passage, the screw thread of the release member being provided on an outer surface of the inner sleeve portion.

28. A fluid coupling as claimed in claim 27, wherein the screw threads are disengageable upon reverse direction rotation of the release member, and upon disengagement the screw threads are axially spaced apart, the release member being axially movable relative to the female coupling member during the preliminary movement in order to bring the screw threads into engagement.

29. A fluid coupling as claimed in claim 28, wherein the biasing means includes a biasing element acting on the release member to bias the release member in an axial direction in which the disengaged screw threads are maintained in spaced apart relation, the release member being manually movable against the bias to bring the screw threads into engagement.

30. A fluid coupling as claimed in claim 29, wherein the biasing element is a biasing spring mounted in a circumferential clearance space formed between the release member and the tubular coupling body at the inlet end of the female coupling member, and acts between the release member and tubular coupling body.

31. A fluid coupling as claimed in claim 30, wherein the release member includes an outer sleeve portion coaxially surrounding the tubular coupling body and connected to the inner sleeve portion, the outer sleeve portion being manually grippable for movement to progressively interengage the screw threads.

32. A fluid coupling as claimed in claim 31, wherein the outer sleeve portion overlies and covers the clearance space and biasing spring between the release member and the tubular coupling body.

33. A fluid coupling as claimed in claim 22, wherein the locking mechanism includes a plurality of locking elements carried by one of the coupling members and movable between a release position disengaging from the other coupling member and a locking position in which the locking members extend between the coupling members and engage the other coupling member thereby to releasably interconnect the coupling members together, the release member upon movement to operate the lock release mechanism engaging the locking elements and moving them to their release position to disengage the coupling members.

34. A fluid coupling as claimed in claim 33, wherein the locking mechanism includes a circumferential retaining recess provided in the female coupling member, and the locking elements include arcuate locking segments positioned in side-by-side relation along the recess for inward movement from the release position to the locking position.

35. A fluid coupling as claimed in claim 34, wherein the locking elements are generally radially movable between the release and locking positions, the locking mechanism includes biasing means engaging and biasing the locking elements into the locking position, and the release member engages the locking elements upon movement thereof to radially drive the locking elements against the bias into the release position.

36. A fluid coupling as claimed in claim 35, wherein the release member includes a release sleeve extending coaxially between the interconnected coupling members and having an abutment rim facing toward the locking elements, whereupon movement of the release member to operate the lock release mechanism causes the release sleeve to move in an axial direction toward the locking elements, engagement with the abutment rim driving the locking elements into the release position.

37. A female coupling member, releasably interconnectable with a male coupling member to form a fluid coupling, the female coupling member comprising:

a tubular coupling body having an inlet end for axially receiving the inlet end of the male coupling member, and an outlet end connectable to a fluid flow line;

a locking mechanism operable to exert a retaining influence on the male coupling member, when received within the female coupling member, to releasably interconnect the male and female coupling members; and, a lock release mechanism selectively operable to remove the retaining influence of the locking mechanism so as to release the male and female coupling members, the lock release mechanism including:

a release member being manually movable to operate the lock release mechanism movement of the release member including a preliminary movement to a preparatory position in which the lock release member is then able to operate the lock release mechanism to remove the retaining influence thereof followed by a further movement which operates the lock release mechanism to remove the retaining influence, the preliminary movement of the release member being in a direction along a longitudinal axis of the coupling, and the further movement of the release member being in compound rotational and lineal directions respectively about and along the longitudinal axis of the coupling, wherein the lock release member is slidably and rotatably carried on the tubular coupling body, and slidably moves along the tubular coupling body during the preliminary movement, and the lock release mechanism includes at least one screw thread on the coupling body and at least one co-operable screw thread on the release member, the screw threads progressively interengaging upon rotation of the release member on the tubular coupling body to cause the release member to move in the compound rotational and lineal directions, wherein the screw threads are disengageable upon reverse direction rotation of the release member, and upon disengagement the screw threads are axially spaced apart, the release member being axially movable relative to the coupling body member during the preliminary movement in order to bring the screw threads into engagement, and wherein the lock release mechanism includes a biasing element acting on the release member to bias the release member in an axial direction in which the disengaged screw threads are maintained in spaced apart relation, the release member being manually movable against the biasing element to bring the screw threads into engagement.

\* \* \* \* \*